United States Patent Office 2,905,593
Patented Sept. 22, 1959

2,905,593
PRODUCTION OF OXIDASES BY ASPERGILLI FOR MONOHYDROXYLATION OF STEROIDS

Eugene L. Dulaney, Rahway, N.J., assignor to Merck & Co., Inc., Rahway, N.J., a corporation of New Jersey No Drawing. Application January 6, 1955
Serial No. 480,304

8 Claims. (Cl. 195—67)

This invention relates to methods for effecting the monohydroxylation of steroids by the action of microorganisms. More particularly, it is concerned with processes for the production of 11-hydroxy steroids by subjecting 11-desoxy steroids to the action of hydroxylating strains of microorganisms or the hydroxylating enzymes of such microorganisms under conditions which will inhibit the formation of polyhydroxy compounds.

The discovery of the remarkable therapeutic properties of cortisone and similar related compounds having an oxygen substituent at C–11 has stimulated wide interest in finding simpler and more economical methods of preparing such compounds. One of the principal difficulties encountered in the synthesis of cortisone and its related compounds is the introduction of the 11-oxygen substituent. Although various methods have been developed for the synthesis of 11-oxygenated steroids, such processes are not entirely satisfactory and other methods more suitable for the commercial preparation of 11-oxygen substituted steroids in high yields have been sought.

Methods for effecting the oxygenation of steroids by the action of microorganisms are known in the art. Thus, species of Actinomycetes are known to introduce oxygen into a number of positions of the steroid molecule, including position 11. Similarly, various species of genera included in the order Mucorales also introduce oxygen in various positions of the steroid ring structure.

Unfortunately, the utilization of the known procedures for introducing oxygen substituents at position 11 by the action of microorganisms is beset by a number of troublesome difficulties. One such difficulty is that the oxygenation results in the formation of a multiplicity of oxygenated products which are difficult to separate, thereby resulting in the obtainment of poor yields of the desired 11-oxygenated steroids. Thus, in the oxidation of steroids having methylene substituents at position 6 and 11 by the action of strains of Aspergillus, there is obtained a mixture of the 11-hydroxy steroid and the 6,11-dihydroxy steroid. The hydroxylation of the steroid in the 6 position in addition to the 11 position leads to the formation of an undesirable by-product which is difficult to separate from the desired 11-hydroxy compound and results in the obtainment of the desired compound in low yields. Accordingly, it would be very desirable indeed to provide a means which would prevent the undesired polyhydroxylation of steroids by the action of hydroxylating strains of microorganisms or their enzymes.

One object of the present invention is to provide a means for preventing or inhibiting the polyhydroxylation of steroids by the action of hydroxylating microorganisms or their enzymes. Another object is to provide a means of preventing the $6\beta$-hydroxylation of steroids having methylene groups at positions 6 and 11 which are subjected to the action of hydroxylating strains of Aspergillus. A further object is to provide a means for the conversion of progesterone to $11\alpha$-hydroxy progesterone substantially free of $6\beta,11\alpha$-dihydroxy progesterones by the action of enzymes produced by hydroxylating strains of *Aspergillus ochraceus*. These and other objects of my invention will be readily apparent from the detailed description of my invention hereinafter provided.

In accordance with my invention, it is now found that the polyhydroxylation by microorganisms can be inhibited or prevented under conditions whereby the growth of the microorganism is carefully controlled by the medium constituents. Under such conditions the enzyme system can be altered from that usually occurring to produce a system preventing or inhibiting the polyhydroxylation of the steroids present. I have found that these carefully controlled conditions can be brought about either by limiting the amount of a specific element essential to the growth of the microorganisms, or by including in the medium a substance which will inhibit the growth of the microorganisms. By growing the microorganism under such conditions there is produced a system which will effect the polyhydroxylating ability of the microorganisms. The conditions under which a particular microorganism will permit monohydroxylation of steroids with a minimum amount of the undesired polyhydroxylated steroids can be determined by a series of test fermentations of the organism and the steroid to be oxygenated in which the medium constituents are varied to ascertain the optimum conditions producing this desired result.

The methods of the present invention are especially valuable in inhibiting or preventing the polyhydroxylating ability of species of Aspergillus which are capable of introducing an $11\alpha$-hydroxy substituent in 11-desoxy steroids. Under the usual conditions use of these species of Aspergillus result in converting 11-desoxy steroids to the corresponding $11\alpha$-hydroxy steroids which are then further transformed by the action of the microorganism enzyme system to the corresponding $6\beta,11\alpha$-dihydroxy steroid.

However in accordance with a specific embodiment of my invention, I have found that the formation of the undesired $6\beta,11\alpha$-dihydroxy steroids by the action of strains of Aspergillus normally producing such dihydroxy compound can be inhibited or prevented by carefully controlling the growth of the oxygenating microorganisms. The methods by which the growth of the microorganism can be changed to produce essentially only monohydroxylation will be more readily understood by the application of such methods in hydroxylating progesterone by the action of hydroxylating strains of Aspergillus to produce the desired $11\alpha$-hydroxy progesterone in substantially pure form and in higher yields than was heretofore possible.

Pursuant to this specific embodiment of my invention, it is now found that progesterone can be hydroxylated by the action of hydroxylating strains of Aspergillus to produce substantially only $11\alpha$-hydroxy progesterone by growing such strains in a nutrient medium deficient in a metal required for the growth of the organism, or by inhibiting the growth of the microorganism or by interference with the particular enzyme system effecting 6-hydroxylation in a medium containing a metal ion which acts as an inhibitor for the growth of the microorganism. Thus, I have found that when a strain of *Aspergillus ochraceus* is grown in a medium deficient in zinc ion the hydroxylating enzymes produced in such medium oxygenates progesterone to 11α-hydroxy progesterone with the concomitant formation of only minor amounts of the undesired 6β,11α-dihydroxy progesterones. Generally, I find that a medium containing between about 0.0001 and 0.002 microgram of zinc ion per ml. is sufficiently deficient in zinc ion to inhibit the enzyme system producing 6β-hydroxylation. The fact that such small amounts of zinc will so markedly change the 6β-hydroxylation ability of *Aspergillus ochraceus* is indeed all the more surprising and unexpected since zinc ion is, in fact, required for the growth of *Aspergillus ochraceus*.

The hydroxylation of progesterone to produce predominantly the desired 11α-hydroxy progesterone in accordance with this method of my invention is most conveniently and readily accomplished in a synthetic medium, although, if desired, this can also be accomplished in complex mediums by carefully controlling and adjusting the concentration of zinc ion present, as, for example, by removing zinc ions by the action of a chelating agent such as versene. Alternatively, the concentration of the zinc ion in the medium can be depleted by growing another organism requiring zinc ion for its growth. Thus, when *Aspergillus ochraceus* is grown in a synthetic medium deficient in zinc ion the enzymes which effect 6β-hydroxylation are not formed to any great extent. For example, when a suitable strain of *Aspergillus ochraceus* is grown in a medium containing 5% sucrose, 0.76% $NaNO_3$, 0.1% $K_2HPO_4$, 0.05 $MgSO_4.7H_2O$, 0.05% KCl, 0.001% $FeSO_4.7H_2O$, and sufficient distilled water to make 100%, and progesterone is added to the medium after some growth of the microorganism has taken place, the resulting fermentation product contains essentially only 11α-hydroxy progesterones and only minor amounts of the 6β,11α-dihydroxy progesterones.

Alternatively, instead of adding the progesterone to the fermentation medium, the conversion of the progesterone to 11α-hydroxy progesterone can be similarly effected by intimately contacting the steroid with the enzymes formed in the zinc deficient medium. This can be accomplished by separating the cells from the medium after good growth is obtained and mixing the cellular material with the progesterone in a sodium hydroxide-potassium biphthalate buffer at pH 4.0, and allowing the intimately contacted mixture to incubate for a time sufficient to form the desired 11α-hydroxy progesterone.

The results of these and other experiments suggest that the failure of cells grown in a zinc ion deficient medium to 6β-hydroxylate and 11α-hydroxy progesterone is due to the lack of formation of the adaptive enzyme system needed to effect this secondary hydroxylation. From my results, it appears that using a well balanced system in which enough zinc ion is added to allow the organism to grow, and thus bind most of the zinc ion, only a limited amount of protein synthesis occurs and the adaptive enzyme necessary for 11α-hydroxylation of the progesterone is formed. There is apparently not enough zinc ion to allow further protein synthesis and the second adaptive enzyme necessary for 6β-hydroxylation of the progesterone is not formed. While the foregoing views express one possible explanation for the processes of my invention based upon experiments now completed, it is possible that subsequent experiments will, in fact, establish that this explanation is incorrect.

In accordance with a further embodiment of my invention, I have found that when microorganisms are grown in the presence of certain metal ions which inhibit the growth of microorganisms, the production of the adaptive enzyme required for 6-hydroxylation are markedly inhibited. Thus, when *Aspergillus ochraceus* is grown in a synthetic medium containing sufficient amounts of zinc ion but a minor amount of cadmium ion, and progesterone is added to the growing medium, the converted product consists essentially of 11-hydroxy progesterones and only minor amounts of 6β,11α-dihydroxy progesterone is obtained. In general, I have found that this occurs when the nutrient medium contains an amount of cadmium ion equivalent to between about 0.0008 and 0.003 mg. of cadmium per ml. of medium. The concentration of the cadmium ion is critical and it is necessary to employ amounts within this range to obtain optimum results. Amounts less than about 0.0008 ml. of cadmium per ml. are generally insufficient to inhibit the formation of the adaptive enzyme producing 6β-hydroxylation and amounts in excess of 0.003 mg. per ml. are found to be toxic to the organism.

The hydroxylation of progesterone with *Aspergillus ochraceus* grown in the presence of cadmium ions can be effected either by adding the progesterone to the nutrient medium, or by separating the cells grown in such a medium and intimately contacting such cells with progesterone in a suitable buffer medium.

In carrying out the process of the present invention, the steroid to be hydroxylated can be added to the nutrient medium as a suspension in a suitable solvent such as water, as a solution in a solvent such as acetone and propylene glycol or in a finely divided form such as a solid micronized powder. In general, it is desirable that the steroid be present in very finely divided form in order to permit maximum contact with the hydroxylating enzymes and insure completion of the reaction.

The process for effecting monohydroxylation can be effected in both stationary and submerged cultures of the hydroxylating microorganism growing under aerobic conditions, although for practical purposes it is more conveniently carried out by growing the microorganism under submerged conditions in a suitable fermentation medium containing the steroid. The amount of steroid which can be hydroxylated will depend upon the particular medium employed and the concentration of the ingredients in the medium.

The following examples illustrate methods of carrying out this invention.

*Example 1*

| Ingredients | | Medium No. 1 | Medium No. 2 | Medium No. 3 |
|---|---|---|---|---|
| Sucrose | percent | 5 | 5 | 5 |
| $NH_4NO_3$ | do | 5 | | |
| $NaNO_3$ | do | | 0.76 | 0.76 |
| $K_2HPO_4$ | do | 0.65 | 0.1 | 0.1 |
| $MgSO_4.7H_2O$ | do | 0.5 | 0.05 | 0.05 |
| KCl | do | | 0.05 | 0.05 |
| $FeCl_3.6H_2O$ | do | 0.008 | | |
| $FeSO_4.7H_2O$ | do | | 0.001 | 0.001 |
| $ZnSO_4.7H_2O$ | do | 0.005 | | |
| Distilled water | to do | 100 | 100 | 100 |
| $ZnSO_4.7H_2O$ | mg./l. | | | 50 |
| $FeSO_4.7H_2O$ | mg./l. | | | 80 |

Mediums No. 1 and 2 were prepared by dissolving the ingredients in the amounts shown in distilled water. Medium 3 was made up the same as No. 2 and then supplemented by the addition of 50 mg. of $ZnSO_4.7H_2O$ and 80 mgs. of $FeSO_4.7H_2O$ per liter of No. 2 medium.

50 ml. portions of the above mediums were then placed in 250 ml. Erlenmeyer flasks and sterilized by autoclaving at 15 p.s.i.g. for 17 minutes. The flasks were then inoculated with a small amount of a vegetative growth of *Aspergillus ochraceus* NRRL 450 strain 260-4718 and the flasks incubated at 28° C. on rotary shakers moving at 220 r.p.m. and describing a circle of 1.5 inches in diameter. After 24–48 hours of incubation, a solution of 10 mg. of progesterone in 2.5 ml. of propylene glycol was added to each of the flasks. After the addition of the progesterone, the flasks were replaced on the shaker and individual flasks were removed at intervals for analysis.

For assay, the 50 ml. of whole broth was homogenized in a Waring blender for one minute, then extracted three times with 25 ml. amounts of chloroform and the three extracts combined and taken down to dryness at room temperature. The dried extract was taken up in an appropriate amount of pure methanol and aliquots spotted on Wattman No. 1 filter paper. The chromatograms were developed using the solvent systems and method of Zaffaroni.

The conversion products were located by means of an ultraviolet light scanner, then eluted with pure methanol, and the optical densities of the eluted products determined at 2400 A. The percent conversion of the progesterone to the transformation products was then calculated from the optical densities.

Using the procedures described above, the following results were obtained with the three mediums supplemented with progesterone:

| Medium No. | Age of sample, hrs. | Progesterone Percent remaining | Percent conversion to 11α-hydroxy-progesterone | Percent conversion to 6β,11α-dihydroxy-progesterone |
|---|---|---|---|---|
| 1 | 6 | 24.4 | 8.2 | 0 |
|   | 12 | 7.8 | 29.3 | 37.3 |
|   | 18 | 3.6 | 0 | 64.4 |
|   | 24 | 7.1 | 0 | 68.1 |
|   | 30 | 10.3 | 0 | 88.0 |
|   | 36 | 8.8 | 0 | 70.6 |
|   | 48 | 0 | 0 | 73.3 |
|   | 60 | 0 | 0 | 82.5 |
| 2 | 6 | 75.8 | 0 | 0 |
|   | 12 | 35.3 | 44.5 | 0 |
|   | 18 | 23.5 | 71.3 | 0 |
|   | 24 | 7.8 | 81.4 | 5.1 |
|   | 30 | 13.7 | 79.0 | 7.4 |
|   | 36 | 0 | 75.3 | 0 |
|   | 48 | 0 | 71.2 | 10.5 |
|   | 60 | 0 | 69.2 | 11.1 |
|   | 6 | 5.9 | 74 | 5 |
|   | 12 | 5.3 | 69.7 | 11.6 |
|   | 18 | 0 | 8.5 | 32.3 |
|   | 24 | 0 | 8.0 | 42.3 |
|   | 30 | 0 | 0 | 45 |
|   | 50 | 0 | 0 | 36.4 |

Example 2

Medium No. 2 supplemented with 40 mg./l. of $ZnSO_4 \cdot 7H_2O$ was prepared, sterilized, inoculated with *Aspergillus ochraceus* NRRL 450 strain 260–4718 and incubated as described in Example 1. At the end of the incubation period, a solution of 10 mg. of progesterone in 2.5 ml. of propylene glycol was added. After further incubation on the shaker, individual flasks were removed for analysis by the method of Zaffaroni as described in Example 1. The analytical results are shown in the following table:

| Age of samples, hrs. | Progesterone, Percent remaining | Percent conversion to 11α-hydroxy-progesterone | Percent conversion to 6β,11α-dihydroxy-progesterone |
|---|---|---|---|
| 6 | 52.5 | 14.5 | 0 |
| 12 | 19.4 | 82.4 | 10.8 |
| 24 | 7.3 | 70.2 | 7.7 |
| 45 | 0 | 10.7 | 31.1 |
| 70 | 0 | --- | 43.3 |

In this experiment the inoculum was developed in Medium No. 2 with no zinc ion, thus perhaps slowing growth somewhat initially.

Example 3

Medium No. 2 was prepared, sterilized, inoculated with *Aspergillus ochraceus* NRRL 450 strain 260–4718, as described in Example 1, and incubated for four days. At the end of this incubation period, the medium was decanted and the cells washed with a sodium hydroxide-potassium biphthalate buffer at pH 4.0. The cells were then suspended in fresh buffer and 10 mg. of progesterone dissolved in 2.5 ml. of propylene glycol was added. After further incubation on the shaker for 12 hours, the cells and buffer were analyzed for residual sterol and the conversion products. Employing the Zaffaroni technique described in Example 1, it was found that the sample contained 4.1% unchanged progesterone, 76.5% 11α-hydroxy progesterone and 11.2% 6β, 11α-dihydroxy progesterone.

Example 4

Medium No. 2 was prepared, sterilized, inoculated with *Aspergillus ochraceus* NRRL 450 strain 260–4718, and incubated for 4 days as described in Example 1. At the end of this incubation period, varying amounts of progesterone dissolved in propylene glycol was added and the incubation on the shaker continued. The resulting fermented products were then assayed in accordance with the procedures described in Example 1, and the results summarized in the following table:

| Progesterone added, mg./50 ml. medium per flask | Age of sample, hrs. | Progesterone, percent unconverted | Percent conversion to 11α-hydroxy-progesterone | Percent conversion to 6β, 11α-dihydroxy-progesterone |
|---|---|---|---|---|
| 10 | 6 | 21.5 | 28.8 | 0 |
|   | 12 | 9.4 | 87.2 | 0 |
|   | 18 | 0 | 70 | 5.6 |
|   | 24 | 0 | 85.5 | 15 |
|   | 46 | 0 | 54.1 | 13.1 |
| 20 | 6 | 28.5 | 22.6 | 0 |
|   | 12 | 28.4 | 55.3 | 0 |
|   | 18 | 11.6 | 65.8 | 0 |
|   | 24 | 0 | 74.6 | 8.5 |
|   | 46 | 0 | 62.7 | 6.8 |
|   | 70 | 0 | 62.3 | 11.7 |
| 30 | 6 | 57.9 | 8.5 | 0 |
|   | 12 | 32.6 | 29.5 | 0 |
|   | 18 | 26.6 | 44.3 | 0 |
|   | 24 | 11.3 | 66.4 | 3 |
|   | 46 | 4.0 | 70.9 | 8.8 |
|   | 70 | 0 | 64.5 | 8.9 |
| 40 | 6 | 61.7 | 2.8 | 0 |
|   | 12 | 55.5 | 17.9 | 0 |
|   | 18 | 18.4 | 47.8 | 0 |
|   | 24 | 32.0 | 42.0 | 0 |
|   | 46 | 0 | 70.9 | 6.8 |
|   | 70 | 0 | 66.7 | 4.3 |
| 50 | 6 | 56.0 | 2.4 | 0 |
|   | 12 | 37.0 | 16.5 | 0 |
|   | 18 | 33.2 | 32.0 | 0 |
|   | 24 | 32.4 | 39.7 | 0 |
|   | 46 | 12.3 | 56.0 | 2.6 |
|   | 70 | 12.3 | 72.1 | 4.0 |
| 75 | 6 | 56.6 | 3.2 | 0 |
|   | 12 | 34.1 | 9.2 | 0 |
|   | 18 | 45.5 | 23.6 | 0 |
|   | 24 | 41.7 | 21.4 | 0 |
|   | 46 | 38.7 | 49.1 | 0 |
|   | 70 | 15.0 | 61.5 | 1.6 |
| 100 | 6 | 53.5 | 0 | 0 |
|   | 12 | 57.2 | 7.2 | 0 |
|   | 18 | 61.7 | 10.8 | 0 |
|   | 24 | 68.5 | 16.1 | 0 |
|   | 46 | 30.5 | 41.3 | 0 |
|   | 70 | 25.8 | 39.4 | 0 |

Example 5

Medium No. 2 was prepared as described in Example 1. Portions of this medium were then further supplemented with $CdSO_4 \cdot 8H_2O$ at the levels of 1, 5, 10, 15 and 20 mg. per liter respectively. 50 ml. portions of the mediums so prepared were then placed in 250 ml. Erlenmeyer flasks and sterilized by autoclaving at 15 p.s.i.g. for 17 minutes. The flasks were then inoculated with a small amount of a vegetative growth of *Aspergillus ochraceus* NRRL 450 strain 260–4718 containing sufficient zinc ion for the usual 6β-hydroxylation and then incubated at 28° C. on rotary shakers moving at 220 r.p.m. and describing a circle of 1.5 inches in diameter. After 24–48 hours of incubation, a solution of 10 mg. of progesterone in 2.5 ml. of propylene glycol was added to each of the flasks. The flasks were then replaced on the shaker and individual flasks were removed at intervals for analysis by the method of Zaffaroni as described in Example 1.

The results of this analysis were tabulated as follows:

| Level of 3CdSO₄.8H₂O | Age of Sample, hrs. | Progesterone, percent remaining | Percent conversion to 11α-hydroxyprogesterone | Percent conversion to 6β,11α-dihydroxyprogesterone |
|---|---|---|---|---|
| 1 mg./l. | 6 | 34.2 | 64.3 | 5.5 |
|  | 12 | 6.4 | 56.1 | 13.3 |
|  | 24 | 12.6 | 32.2 | 32.8 |
|  | 48 | 0 | 12.1 | 49.9 |
|  | 72 | 0 | 7.5 | 39.6 |
|  | 96 | 0 | 13.8 | 45.7 |
| 5 mg./l. | 6 | 27.6 | 21.7 | 5.3 |
|  | 12 | 3.2 | 49.5 | 17.0 |
|  | 24 | 10.2 | 9.1 | 42.1 |
|  | 48 | 0 | 6.2 | 48.7 |
|  | 72 | 0 | 7.9 | 42.5 |
|  | 96 | 0 | 80.0 | 42.3 |
| 10 mg./l. | 6 | 63.2 | 10.5 | 4.4 |
|  | 12 | 32.3 | 32.1 | 0 |
|  | 24 | 9.8 | 64.1 | 8.4 |
|  | 48 | 2.1 | 46.0 | 16.7 |
|  | 72 | 11.1 | 76.8 | 4.7 |
|  | 96 | 0 | 6.1 | 54.8 |
| 15 mg./l. | 6 | --- | --- | --- |
|  | 12 | 59.0 | 16.7 | --- |
|  | 24 | 39.6 | 59.3 | 6.1 |
|  | 48 | 7.5 | 61.2 | 5.3 |
|  | 72 | 4.5 | 46.8 | 14.1 |
|  | 96 | --- | --- | --- |
| 20 mg./l. | \multicolumn{4}{c}{No growth} | | | |

| Level of 3CdSO₄.8H₂O | | |
|---|---|---|
| 20 mg./l. | No growth | |

Various changes and modifications may be made in my invention, certain preferred embodiments of which are herein disclosed, without departing from the scope thereof; to the extent that these changes and modifications are within the scope of the appended claims, they are to be considered as part of my invention.

I claim:

1. The process for the production of improved hydroxylating enzymes capable of converting 11-desoxy steroids to 11α-hydroxy steroids and inhibiting the concomitant formation of polyhydroxylated steroids, which comprises growing a hydroxylating strain of Aspergillus in a medium containing from about 0.001 to about 0.002 micrograms of zinc ion per ml.

2. The process of claim 1 wherein the hydroxylating strain of Aspergillus is *Aspergillus ochraceus*.

3. The process for the production of improved hydroxylating enzymes capable of converting 11-desoxy steroids to 11α-hydroxy steroids and inhibiting the concomitant formation of polyhydroxylated steroids, which comprises growing a hydroxylating strain of Aspergillus in a medium containing an amount of cadmium equivalent to from about 0.0008 to about 0.003 mg. of cadmium per ml.

4. The process of claim 3 wherein the hydroxylating strain of Aspergillus is *Aspergillus ochraceus*.

5. In the process for the conversion of an 11-desoxy steroid to an 11α-hydroxy steroid by intimately contacting said 11-desoxy steroid with hydroxylating enzymes produced by growing a hydroxylating strain of Aspergillus, the improvement which comprises growing said hydroxylating strain of Aspergillus in a medium containing from about 0.001 to about 0.002 micrograms of zinc ion per ml.

6. The process of claim 5 wherein the hydroxylating strain of Aspergillus is *Aspergillus ochraceus*.

7. In the process for the conversion of an 11-desoxy steroid to an 11α-hydroxy steroid by intimately contacting said 11-desoxy steroid with hydroxylating enzymes produced by growing a hydroxylating strain of Aspergillus, the improvement which comprises growing said hydroxylating strain of Aspergillus in a medium containing a soluble cadmium salt having an amount of cadmium equivalent to from about 0.0008 to about 0.003 mg. of cadmium per ml.

8. The process of claim 7 wherein the hydroxylating strain of Aspergillus is *Aspergillus ochraceus*.

References Cited in the file of this patent

UNITED STATES PATENTS

| 2,602,769 | Murray | July 8, 1952 |
| 2,649,402 | Murray | Aug. 18, 1953 |

OTHER REFERENCES

Lafar: Technical Mycology, vol. 2, part 1, Griffin, London, 1903, p. 44.

Foster: The Botanical Review, vol. 5, No. 4, April 1939, pp. 213–214, 221.

Porter: Bacterial Chemistry and Physiology, John Wiley & Sons, Inc., New York, pp. 626–629.

Summer et al.: The Enzymes, vol. 2, part 2, Academic Press, N.Y., 1952, pp. 1318–1321.